(12) United States Patent
Panwar et al.

(10) Patent No.: US 12,099,805 B2
(45) Date of Patent: Sep. 24, 2024

(54) GENERATION OF CAUSAL EXPLANATIONS FOR TEXT MODELS

(71) Applicant: International Business Machines Corporation, Armonk, NY (US)

(72) Inventors: Naveen Panwar, Bangalore (IN); Deepak Vijaykeerthy, Bangalore (IN); Nishtha Madaan, Gurgaon (IN); Samiulla Zakir Hussain Shaikh, Bangalore (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 17/530,867

(22) Filed: Nov. 19, 2021

(65) Prior Publication Data

US 2023/0161960 A1 May 25, 2023

(51) Int. Cl.
*G06F 40/284* (2020.01)
*G06F 18/2431* (2023.01)
*G06F 40/30* (2020.01)
*G06N 20/00* (2019.01)

(52) U.S. Cl.
CPC ........ *G06F 40/284* (2020.01); *G06F 18/2431* (2023.01); *G06F 40/30* (2020.01); *G06N 20/00* (2019.01)

(58) Field of Classification Search
CPC ........ G06F 40/284; G06F 40/30; G06N 20/00
USPC .................. 704/4, 8–10, 231, 251
See application file for complete search history.

(56) References Cited

U.S. PATENT DOCUMENTS

| 10,866,992 B2 | 12/2020 | Pol et al. | |
| 11,341,514 B2* | 5/2022 | Thakkar | G06F 18/24155 |
| 2019/0318407 A1* | 10/2019 | Giridhari | G06Q 30/0627 |
| 2021/0117613 A1 | 4/2021 | Galitsky | |
| 2021/0141842 A1 | 5/2021 | Pol et al. | |

(Continued)

FOREIGN PATENT DOCUMENTS

CN 112100312 A 12/2020

OTHER PUBLICATIONS

Christopher Grimsley et al., "Why Attention is Not Explanation: Surgical Intervention and Causal Reasoning about Neural Models", Proceedings of the 12th Conference on Language Resources and Evaluation (LREC 2020), May 11-16, 2020, Marseille, 11 pages, European Language Resources Association.

(Continued)

*Primary Examiner* — George C Monikang
(74) *Attorney, Agent, or Firm* — James L. Olsen

(57) ABSTRACT

One embodiment provides a method, comprising: receiving an input sentence for a classification by a machine-learning model, where the classification is based upon a sentiment of the input sentence; splitting the input sentence into a plurality of tokens, each of the plurality of tokens corresponding to a term within the input sentence; creating a causal subgraph from the plurality of tokens, wherein the creating is based upon a causal relationship identified between tokens of the plurality of tokens; identifying, using the causal subgraph, tokens of the plurality of tokens influencing the classification; and generating, based upon the tokens of the plurality of tokens, a causal explanation for the classification, wherein the causal explanation identifies at least one portion of the input sentence resulting in the classification.

20 Claims, 7 Drawing Sheets

(56) References Cited

U.S. PATENT DOCUMENTS

2022/0036175 A1* 2/2022 Krishnamurthy ........ G06N 3/08
2023/0050889 A1* 2/2023 Kumar Jaya Kumar ....................
G06F 16/9027

OTHER PUBLICATIONS

Zhaoning Li et al., "Causality Extraction Based on Self-Attentive BILSTM-CRF with Transferred Embeddings", Nov. 8, 2020, 39 pages.
Hyemi Kim et al., "Counterfactual Fairness with Disentangled Causal Effect Variational Autoencoder", Dec. 9, 2020, 9 pages.

* cited by examiner

GENERATION OF CAUSAL EXPLANATIONS FOR TEXT MODELS

BACKGROUND

Utilizing machine-learning models for classifying information is helpful since the model can classify information much quicker and more efficiently than a human, which allows for the classification of much more information. Thus, the use of machine-learning models is becoming more common in order to glean statistics or other characteristics about information. A machine-learning model is trained on annotated or labeled data, referred to as a training dataset, and is then able to learn how classifications of information should be performed. The model can then be deployed and used to classify or label new information. However, machine-learning models are only as accurate as the training dataset used to train the model. Additionally, models can inaccurately classify information, particularly text information, due to variations in context, emotion, and ambiguities.

BRIEF SUMMARY

In summary, one aspect of the invention provides a method, including: receiving an input sentence for a classification by a machine-learning model, where the classification is based upon a sentiment of the input sentence; splitting the input sentence into a plurality of tokens, each of the plurality of tokens corresponding to a term within the input sentence; creating a causal subgraph from the plurality of tokens, wherein the creating is based upon a causal relationship identified between tokens of the plurality of tokens; identifying, using the causal subgraph, tokens of the plurality of tokens influencing the classification; and generating, based upon the tokens of the plurality of tokens, a causal explanation for the classification, wherein the causal explanation identifies at least one portion of the input sentence resulting in the classification Another aspect of the invention provides an apparatus, including: at least one processor; and a computer readable storage medium having computer readable program code embodied therewith and executable by the at least one processor; wherein the computer readable program code is configured to receive an input sentence for a classification by a machine-learning model, wherein the classification is based upon a sentiment of the input sentence; wherein the computer readable program code is configured to split the input sentence into a plurality of tokens, each of the plurality of tokens corresponding to a term within the input sentence; wherein the computer readable program code is configured to create a causal subgraph from the plurality of tokens, wherein the creating is based upon a causal relationship identified between tokens of the plurality of tokens; wherein the computer readable program code is configured to identify, using the causal subgraph, tokens of the plurality of tokens influencing the classification; and wherein the computer readable program code is configured to generate, based upon the tokens of the plurality of tokens, a causal explanation for the classification, wherein the causal explanation identifies at least one portion of the input sentence resulting in the classification An additional aspect of the invention provides a computer program product, including: a computer readable storage medium having computer readable program code embodied therewith, the computer readable program code executable by a processor; wherein the computer readable program code is configured to configured to receive an input sentence for a classification by a machine-learning model, wherein the classification is based upon a sentiment of the input sentence; wherein the computer readable program code is configured to split the input sentence into a plurality of tokens, each of the plurality of tokens corresponding to a term within the input sentence; wherein the computer readable program code is configured to create a causal subgraph from the plurality of tokens, wherein the creating is based upon a causal relationship identified between tokens of the plurality of tokens; wherein the computer readable program code is configured to identify, using the causal subgraph, tokens of the plurality of tokens influencing the classification; and wherein the computer readable program code is configured to generate, based upon the tokens of the plurality of tokens, a causal explanation for the classification, wherein the causal explanation identifies at least one portion of the input sentence resulting in the classification.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
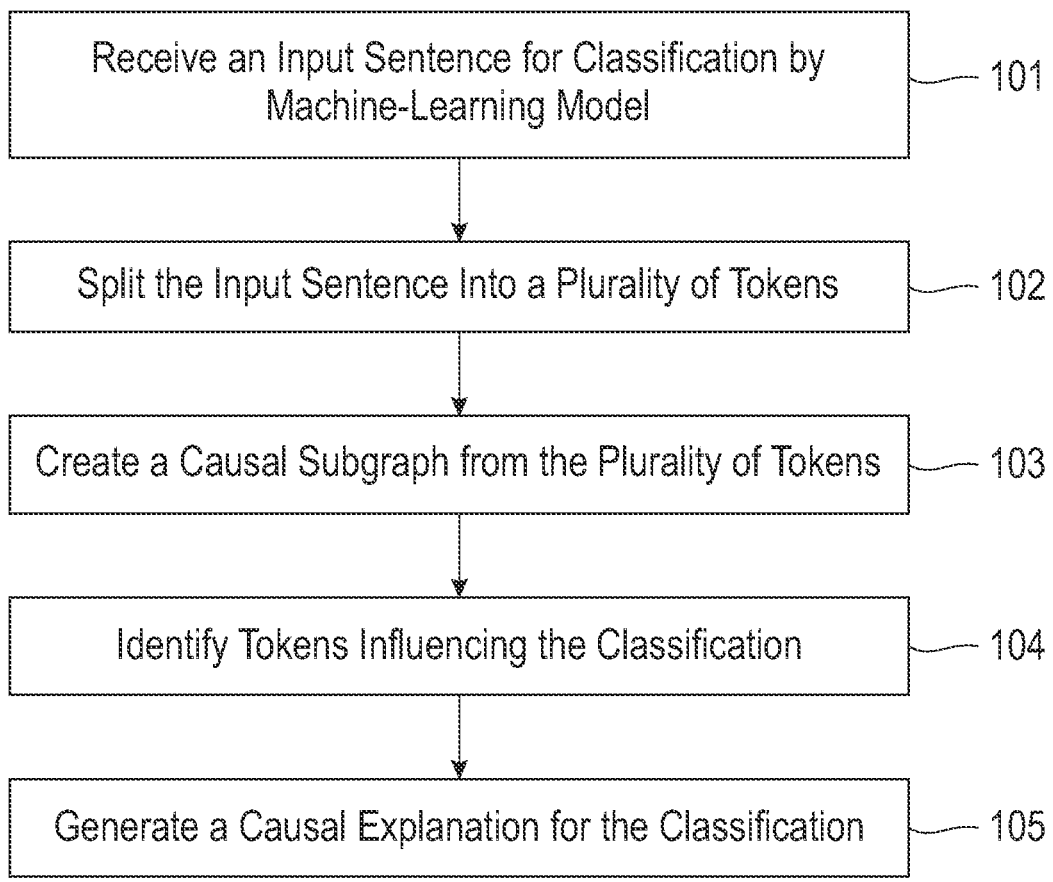
FIG. 1 illustrates a method of generating a causal explanation for the classification of an input text by a machine-learning model by generating a causal subgraph from tokens corresponding to the input sentence and identifying the tokens influencing the classification.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

When classifying text, a machine-learning model may misclassify the text due to different causes. For example, a single word may have different meanings, the context of a word may change the intent of the word, the context of a word may provide an indication of a sentiment of the word, and the like. In other words, language is very complex and, while humans may be able to identify differences in meaning, a machine-learning model may have a more difficult time in accurately classifying the text. Thus, a user may wish to not only receive a classification from a machine-learning model regarding a text, but may also want to understand how the model came to that classification. This is referred to as explainability for a machine-learning model, meaning the system and/or model explains how a classification was identified.

In conventional text model techniques, it is common practice for a system to produce multiple perturbations for a received input using different techniques. The system utilizes machine-learning, also referred to as artificial intelligence (AI), models to attempt to identify or model the behavior of changes between the perturbations of the different techniques. Each perturbation of the received input may then be weighed against one another until a desired result is found. The method of utilizing a plurality of perturbations for an input may be best used on short inputs and text models, because the number of perturbations is typically reliant on the number of terms present in the received input. For example, if the received input comprises five (5) terms then five perturbations may be produced. As can be understood having to generate perturbations for every term can get time-consuming across many different inputs and becomes especially unwieldy when each input has many more terms.

The conventional techniques lack explanations as to why a classification has occurred. Establishing constraints on a model in an attempt to receive a desired value may include using a removal method of a random term, and by use of AI model, a system may come to a conclusion regarding the desired value, but lack the reasoning behind why a model or a term within a model received a particular value. The random testing of terms within a model assist in identifying the token that is affecting the classification by the AI model. However, not only does this not explain why the classification occurred, but testing random terms from a plurality of perturbations increases the amount of time and energy needed to come to a conclusion. Additionally, randomly testing terms is not truly identifying a causal attribute within a system but rather practices a guess-and-check methodology.

Accordingly, an embodiment provides a system and method for generating a causal explanation subsequent to receiving an input sentence at an information handling device by utilizing a machine-learning method that separates the input sentence into a plurality of tokens and determines relationships between each token to further determine the tokens influencing a classification of the received input sentence. The relationships and classification influencing tokens may then be utilized to generate an explanation explaining why the machine-learning model made the classification. The system identifies and splits a received input sentence into tokens. The system may utilize an information extraction, natural language processing, semantic analysis, syntactic analysis, or the like, technique when splitting the input sentence into a plurality of tokens.

Using the tokens, the system creates a causal subgraph based upon a causal relationship between the tokens. One or more of the plurality of tokens may have an associated causal attribute, for example, a protected attribute, an aspect attribute, or the like. The causal attribute can be utilized when producing the causal subgraph. Additionally, a sentiment of the input may be identified and used in determining an accuracy of the classification. For example, the system can determine if the sentiment of the input differs from the sentiment of the classification. The system identifies the tokens within the causal subgraph that influence the classification. For example, the system may assign a value to each token to conclude which tokens of the received input influence the classification of the input sentence. Based upon the tokens that are influencing the classification, the system can generate a causal explanation for the classification. The causal explanation identifies reasoning explaining why the input sentence was classified as it was by the machine-learning model.

Such a system provides a technical improvement over current systems for machine-learning models for text classification by providing a technique for providing a causal explanation to a user with respect to the classification made by the model. Instead of relying on a plurality of perturbations for a single received input, the described system and method are able to generate a causal subgraph from the input and from the causal subgraph determine what portion of the input is resulting in the classification by the machine-learning model. Thus, the described system greatly reduces the time and power necessary when producing the classification. Additionally, the subgraph allows for a more thorough and accurate causal explanation technique that is not possible with conventional methods that only identify the change in classification by removing tokens.

FIG. 1 illustrates a method for generating a causal explanation for the classification of an input text by a machine-learning model by generating a causal subgraph from tokens corresponding to the input sentence and identifying the tokens influencing the classification. At 101, a system may receive an input sentence for classification by a machine-learning model. Receiving an input sentence may include accessing a data storage location having input sentences, being provided the input sentence from a user or other source, or any other method of obtaining information or input. An example that will be used here throughout, the machine-learning model may be trained to classify input into positive, negative, and neutral sentiment. The example that will be used will be the classification of restaurant reviews and classifying whether the review is positive or negative. However, this example is not intended to limit this disclosure in any way to models that classify sentiment and/or models that classify restaurant or other types of reviews. Rather, the disclosure is intended to cover models that are designed to classify text or language inputs. Additionally, the term "input sentence" or "sentence" will be used here throughout. However, it should be understood that while this may include a traditional sentence, it may also include phrases, a few words, or even a single word, for example, an answer to a prompted question. In this case, the sentence may include both the prompted question and the answer so that the system has context.

In parallel with receiving the input at the machine-learning model for classification, the input sentence is received at a causal explanation system. The causal explanation system analyzes the sentence and the classification by the machine-learning model to generate the causal explanation as discussed herein. The causal explanation system may work in parallel with the machine-learning model or may receive the classification from the model and then generate the causal explanation. Alternatively, some steps carried out by the causal explanation system may run in parallel with the machine-learning model and other steps may need output from the machine-learning model.

At 102, the system splits the input sentence into a plurality of tokens. The tokens may represent different parts of the sentence, for example, different parts-of-speech, different entities, or the like, within the sentence. Information extraction techniques, i.e., natural language processing techniques, semantic analysis, syntactic analysis, and the like, may be employed to identify the different parts-of-speech, entities, or the like. In other words, information extraction techniques may be used to split the sentence and generate the tokens.

Not every word within the sentence may be converted to a token. For example, only the terms that may potentially influence the sentiment and/or the classification may be converted into a token. For example, in the received input sentence, "Food was amazing but service was bad," the system may generate tokens for the terms, "food," "amazing," "service," and "bad" as these terms may potentially influence the classification of the input sentence. As another additional or alternative example, the system may not convert articles, prepositions, and/or the like, in the sentence to a token. In other words, the part-of-speech of the term may assist in determining whether the term is converted to a token or not. Referring back to the previous example, the nouns "food" and "service" identify the subject of the input device, and the adjectives "amazing" and "bad" describe those nouns, respectively. Accordingly, these terms may be converted to tokens. On the other hand, the verb "was" and the conjunction "but" may not influence the sentiment of the input sentence and may, therefore, not be converted to a token.

At 103, the causal explanation system may create a causal subgraph from the plurality of tokens. In addition to tokens being tagged with a causal attribute, the causal subgraph can also be tagged with a higher level causal attribute. Creation of the causal subgraph may be based upon a causal relationship between tokens. The causal subgraph may be a directed acyclic graph (DAG) made from the generated tokens. The nodes of the graph correspond to the tokens and edges between tokens correspond to relationships between connected tokens. The DAG is unidirectional meaning that influence of the tokens upon one another may only move in one direction, which assists in determining or identifying a causal relationship between tokens. However, other graphing techniques may be utilized, for example, cyclic graphs, other directed graphs, or the like.

Since the edges between tokens represent relationships between tokens, the edges may be based upon a sentiment of the input or a portion of the input. In other words, the causal relationship between tokens may identify a sentiment for a portion of the input sentence, which can be used to establish an overall sentiment of the input sentence. Since sentences may include multiple parts, with each part referring to different things, a classification by the model may be accurate for one portion and not another portion. Using the example mentioned previously, the sentence, "Food was good but the service was bad," contains two separate parts which each having different causal relationships and different sentiments. Specifically, the first part is "food was good" and has a positive sentiment, and the second part is "service was bad" and has a negative sentiment. Thus, the causal graph can be used to split each of the parts of the input into a different branch of the graph, which allows the causal explanation system to generate a causal explanation for each part.

At 104, the causal explanation system identifies which tokens influence the classification prediction made by the machine-learning model. When identifying the tokens that influence the classification, the causal explanation system may take into account user defined constraints like domain-specific aspects or protected attributes. Domain-specific aspects may be defined by a user or may be defined within a domain ontology. Using the restaurant review example, the domain may be a restaurant language ontology. Protected attributes may be those attributes protected by law, for example, gender, race, ethnicity, and the like. Protected attributes may cause a machine-learning model to misclassify text input because the model may incorrectly identify a term as a protected attribute term which then changes the classification. An example of such a misclassification is illustrated in FIGS. 3B and 3D, which are discussed in more detail further herein. Thus, the creation of the tokens may be based upon a causal attribute of the word, where the causal attribute may be an aspect attribute, for example, a domain aspect attribute, or protected attribute.

The causal attribute can contribute to the sentiment or classification made by the machine-learning model and may, therefore, affect the classification of the input by the model. In other words, domain aspects and/or protected attributes may be terms that the machine-learning model associates with a positive or negative sentiment. This sentiment may be determined based upon the part-of-speech of a token and of a potential causal attribute (e.g., domain aspects, protected attributes, etc.). An aspect attribute term may have a naturally understood sentiment based upon the part-of-speech of the term. For example, referring to the previous example, "bad" was used to describe the "service." Thus, the aspect attribute associated with the token of "bad" has a negative sentiment. Further, a relationship between portions of the input sentence may result in separate sentiments. The fact that different portions of a sentence may have different sentiments may explain part of why the model made an incorrect classification. For example, if one portion of the sentence has a negative sentiment and another portion has a positive sentiment, when the model classifies the overall sentiment it will only take into account the sentiment of one portion, which causes at least a partial misclassification.

In addition to aspect attributes, the system may take into account protected attributes may be keywords that a model ignores when making a classification. Protected attributes are assigned to terms that cannot be used to influence a classification by a model because utilizing these terms to make classifications causes the model to become inappropriately biased towards one group or another. Some example protected attributes may include attributes protected by law, for example, gender, race, ethnicity, and the like, attributes identified by a user, attributes specific to an application, or the like. For example, in a loan application, a user may identify that region cannot influence a classification, making region a protected attribute.

However, in some cases a model could misinterpret a term as having a protected attribute, when it in fact does not. In this case, the model would ignore the term and may then misclassify the input. For example, a term that may be associated with a protected attribute may be a term with more than one meaning. For example, the verb "miss" may have a negative sentiment. However, the term "miss" may also be associated with a protected attribute. Thus, the model may ignore the term "miss" and may then identify the classification as positive even if the term "miss" was intended as a negative verb.

A term having a causal attribute may influence the overall sentiment of the received input. Thus, identifying the term having a causal attribute may assist in determining the token(s) influencing the classification by the model. In other words, the system may determine a causal attribute of the causal subgraph and then identify the token(s) that correspond to the causal attribute. When it is determined that more than one causal attribute is present in an input sentence or more than one token that influences the classification, the causal explanation system may determine the prominent token which has the most influence on the classification of the sentence. Any additional tokens, including those having causal attributes, identified as influencing the classification may be marked or identified as alternative tokens. Thus, the system may identify alternative tokens influencing the classification. The system may then identify the prominent token which has the most influence on the classification, for example, using a loss algorithm (discussed in more detail herein) or other influence calculation algorithm. Additionally, or alternatively, the system may use a weighting technique to identify and select one of the alternative tokens as a primary token to be used in generating the causal explanation.

Since the tokens have been graphed, identifying the prominent tokens and/or alternative tokens may assist in identifying the tokens influencing the classification. The system may work through identifying of tokens influencing the classification by utilizing a causal operator, for example, abduction, action and effect methodology, or the like. For example, using the abduction method the system may select one or more tokens corresponding to the causal attribute. Next, the system may determine if an action for changing the value should be included. For example, if the causal attribute is a protected attribute, it may make sense to change the value of the causal attribute token. The effect of the changing may alter the effect of the token on the overall classification of the sentence, as can be seen in FIGS. 3B and 3D, which can assist in determining if the token influenced the classification. Stated differently, the system may change the value of the token having the causal attribute to identify if that changes the classification by the machine-learning model. If the classification changes, then the system can identify that token as influencing the classification.

When the system is determining the effect of a token on a classification, the system may formulate a loss function that satisfies three requirements, a label prediction, a causal attribute prediction, and a causal relationship prediction. Interpretation of the three parameters may utilize a natural language processing technique to interpret the tokens of the input sentence to further determine a change based upon the presence of a causal attribute. From the interpretation of the causal subgraph with respect to the parameters outlined, the system may formulate a common loss for all three parameters, for example, using the formula:

$$H(A) = tr\left(I + \frac{c}{m} A \times A\right)^n - n = 0$$

where A is a matrix that captures all the relations among the causal attributes and H(A) is the matrix to be DAG with continuous differentiable constraint. This formula calculates loss while maintaining relationships between tokens rather than learning the loss as it pertains to individual tokens. This determination of change (or loss) may further be calculated in total as:

$$T_{total} = \gamma_1 * L_1 + \gamma_2 * L_2 + \gamma_3 * C_1$$

where $\gamma_1$, $\gamma_2$, $\gamma_3$ are hyperparameters for the function, $L_1$ is the categorical cross entropy, $L_2$ is the binary cross entropy with respect to the causal attribute, and $C_1$ is also the matrix to be DAG with continuous differentiable constraint. Calculation of loss may be used when determining the classification value, thereby allowing identification of an influencing token. Thus, the causal graph can be used to identify direct and indirect tokens causing the model classification.

The tokens identified as influencing the classification can be used to generate a causal explanation for the classification at 105. The causal explanation may identify at least one portion or token of the input sentence resulting in the classification. In other words, the classification of the input sentence and the reasoning behind the classification is provided by the system in the causal explanation. The causal explanation provides an identification to the user of what token(s), and correspondingly what portion of the input, resulted in the classification. The system uses the token(s) identified as the prominent token or selected as the primary token to generate the causal explanation. Alternative tokens may also assist in generating the causal explanation but, generally, will not be the focus of the causal explanation. The system can use a natural language processing technique on the identified token(s) to generate a natural language sentence or output to be provided to the user. The causal explanation, along with the classification, can assist the user in determining if the classification is correct. The user could correct any incorrect classifications, remove incorrect classifications, or the like. The user can also provide feedback to the machine-learning model regarding the classification.

Figure 2:
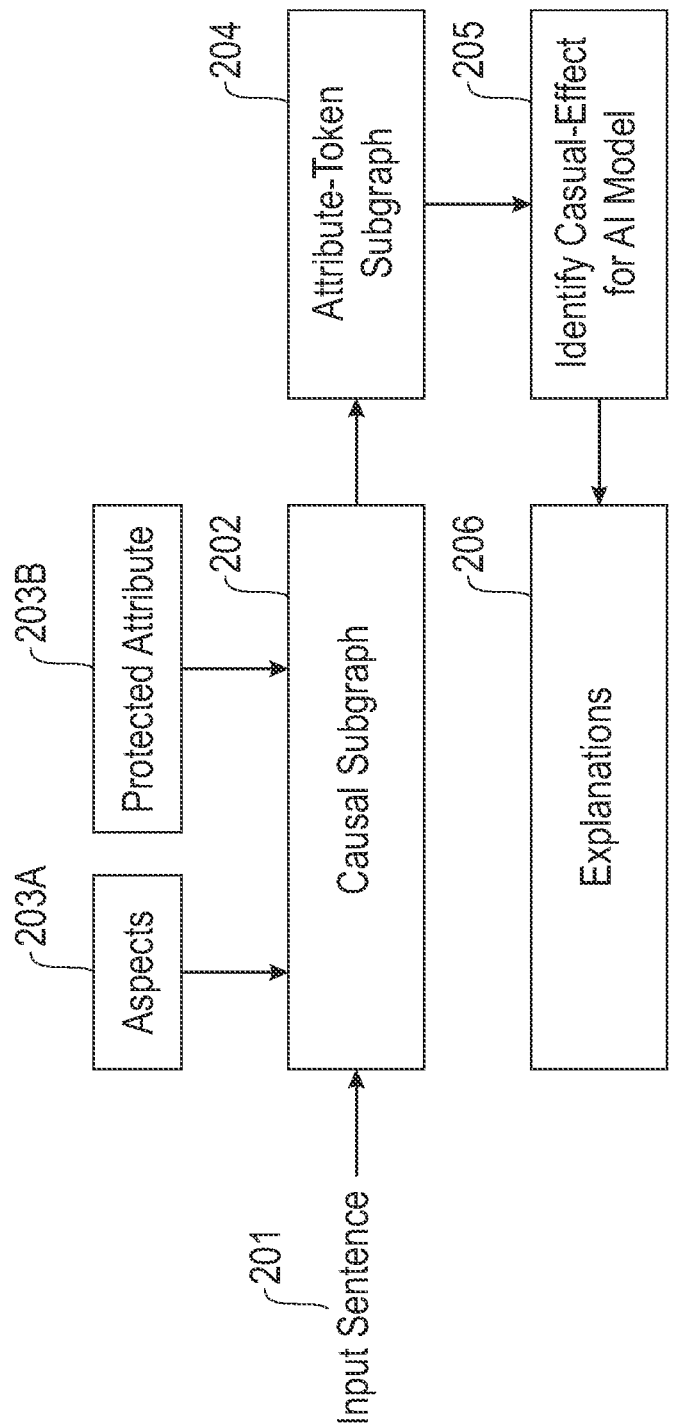
FIG. 2 illustrates an example overall system architecture for generating a causal explanation for the classification of an input text by a machine-learning model by generating a causal subgraph from tokens corresponding to the input sentence and identifying the tokens influencing the classification.

FIG. 2 illustrates an overall system architecture for generating a causal explanation for the classification of an input text by a machine-learning model by generating a causal subgraph from tokens corresponding to the input sentence and identifying the tokens influencing the classification. At 201, a causal explanation system can receive an input sentence. As noted above, a machine-learning model that classifies the input sentence may also receive the input sentence. The causal explanation system produces a causal graph 202. To generate the causal graph 202 the system converts the input sentence to tokens. The causal graph 202 illustrates the relationships between tokens, and also accounts for potential causal attributes, for example, aspect attributes 203A (also referred to as domain-specific attributes) and/or protected attributes 203B that may influence the overall sentiment and, therefore, classification of the input 201. Once the aspects 203A and/or protected attributes 203B are identified, they can be included on the causal graph 202, thereby creating an attribute-token subgraph 204. The attribute-token subgraph 204 can be used to identify the causal-effect of the classification made by the AI model at 205. The causal explanations 206 can then be generated from the identified causal-effect of the classification.

Figure 3A:
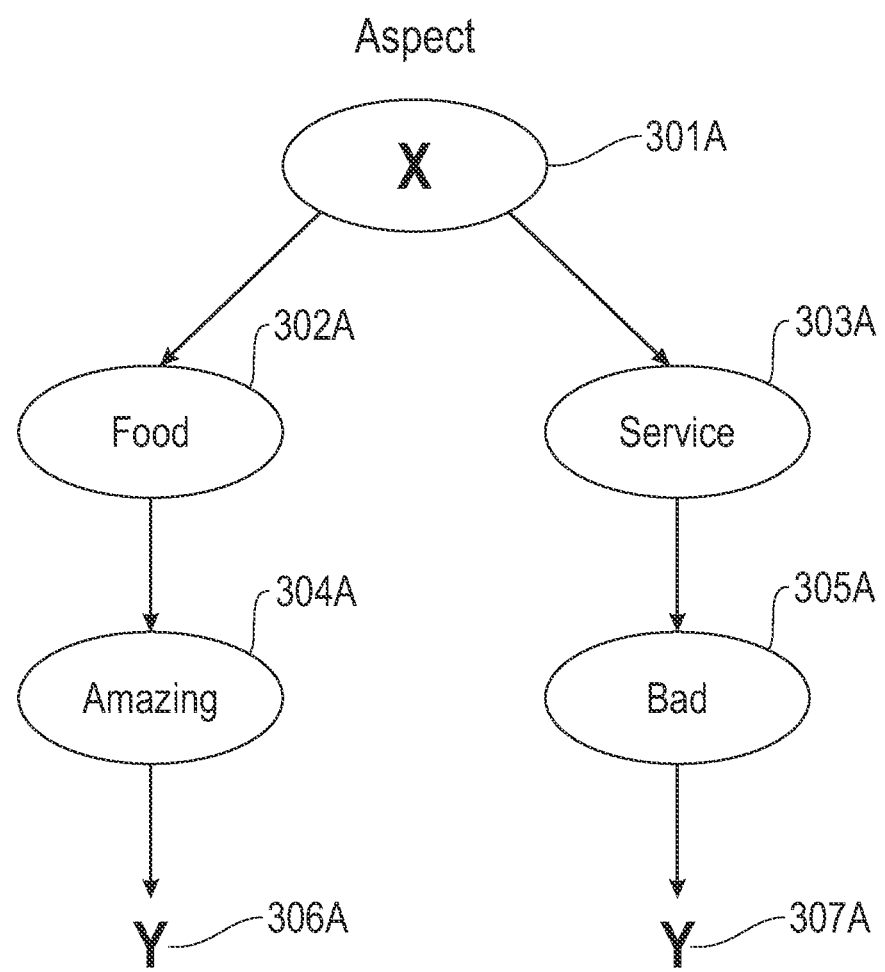
FIG. 3A illustrates an example subgraph based on determined aspect associations and producing a negative sentiment.
Figure 3B:
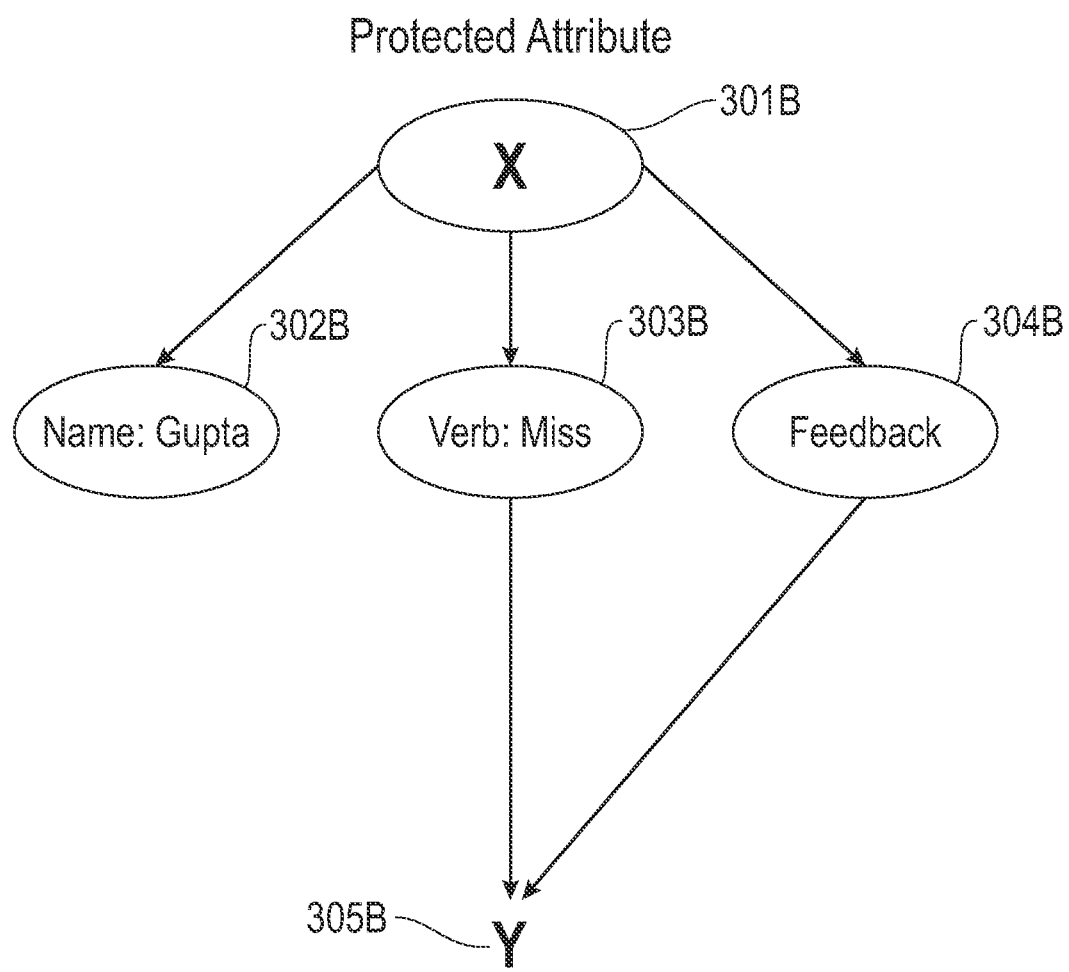
FIG. 3B illustrates an example subgraph based on potential protected attribute associations and producing a negative sentiment.
Figure 3C:
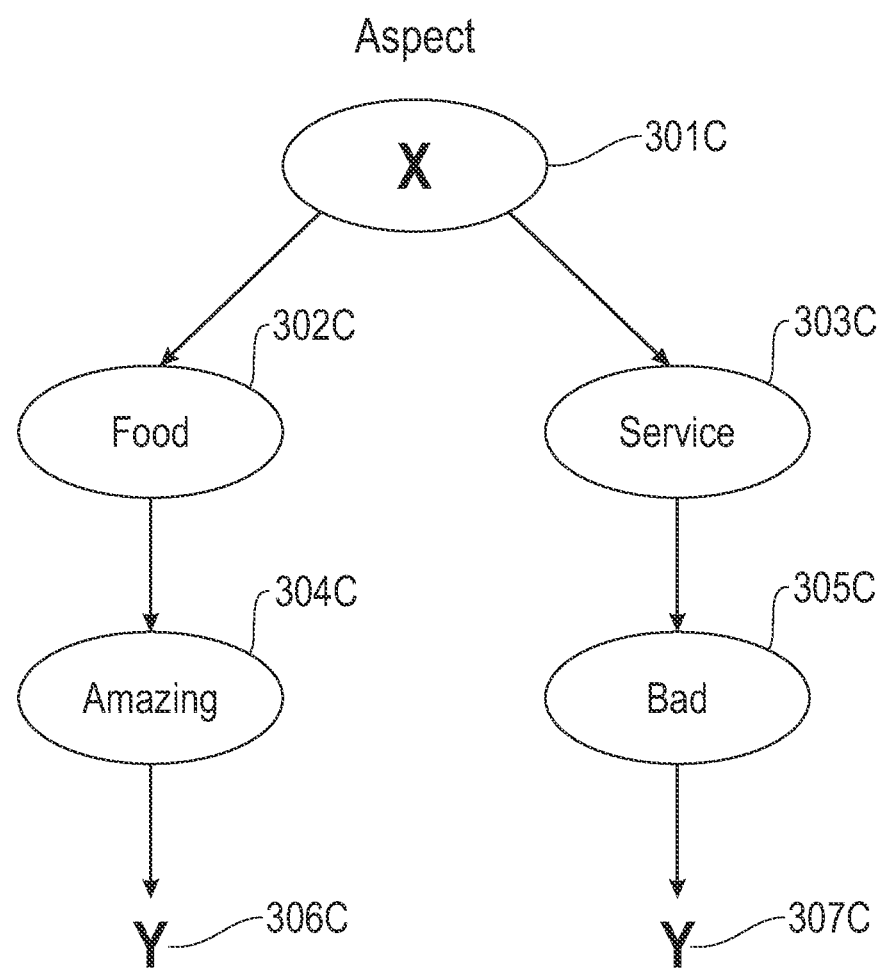
FIG. 3C illustrates an example subgraph based on determined aspect associations and producing a positive sentiment.
Figure 3D:
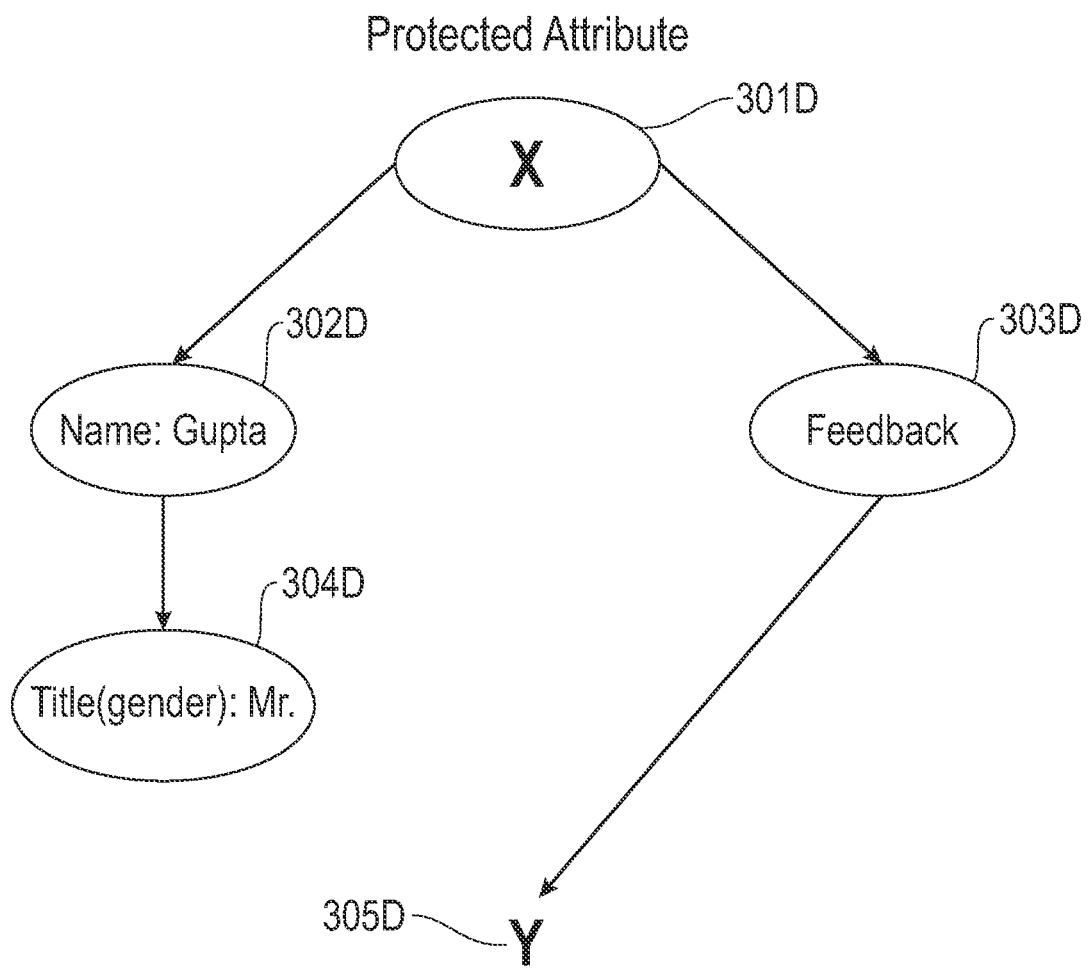
FIG. 3D illustrates an example subgraph based on determined protected attribute associations and producing a positive sentiment.

FIG. 3A-3D illustrate example causal subgraphs and resulting classifications. FIG. 3A illustrates an example subgraph based on determined aspect associations and producing a negative sentiment classification by a machine-learning model. In an embodiment, the input sentence X 301A may be an input sentence that includes tokens having aspect attributes. The example input sentence is "Food was good but service was bad." As can be seen in the illustration of FIG. 3A, the input sentence is split into four tokens. Relationships between the tokens are identified and included in the graph via the edges. Thus, the graph illustrates a relationship between the "food" token 302A and the "amazing" token 304A, while the "service" token 303A and the "bad" token 305A maintain their own relationship. This illustrates an example where different portions of the input result in different sentiments.

These relationships may produce their own sentiment value which may then be weighed when determining the overall sentiment by the model. For example, the "food" token 302A and the "amazing" token may be interpreted as having a positive sentiment at Y 306A. On the other hand, the "service" token 303A and the "bad" token 305A may be interpreted as having a negative sentiment at Y 307A. The model may then make an overall classification. However, whether the model classifies the overall sentiment as positive or negative, it can be seen that this classification is at least partially incorrect. Thus, the system uses the graph to identify which portion of the input resulted in the classification, thereby allowing the user to make any necessary corrections.

FIG. 3C may be the alternative aspect attribute-based DAG including the same tokens but maintaining the different causal effect and thus a different classification and explanation. FIG. 3C illustrates an example subgraph based on determined aspect associations and producing a positive sentiment classification by the model. In this case, the received input sentence X 301C is "Service was bad but food was amazing." The determined tokens and relationships between the tokens may be similar to those established in FIG. 3A; however, based on the order of the input sentence 301C, the sentiment and thereafter the classification of the causal aspect attributes resulted in a positive sentiment classification. Again, this classification is partially incorrect because it only corresponds to a single portion of the input. Thus, the causal explanation can be produced and provided to the user allowing the user to make any corrections to the classification.

FIG. 3B illustrates an example subgraph based on a potential protected attribute and producing a negative sentiment classification by a machine-learning model. In this example, the input sentence is, "Miss Gupta gave good feedback." As can be seen in FIG. 3B, the from the input sentence 301B, three tokens may be produced. The sentence is split into three tokens, "Gupta" 302B, "Miss" 303B, and "feedback" 304B. In this case the machine-learning model misclassified "miss" 303B as a verb and also missed the term "good" in the input sentence as affecting the classification. Thus, the token "Miss" 303B being interpreted as a verb gives the token a negative connotation and results in an incorrect classification by the model. The causal explanation system can identify this issue and provide the explanation to the user, allowing the user to make any necessary corrections.

FIG. 3D illustrates an example subgraph based on a determined protected attribute and producing a positive sentiment classification by the model. In this example, the input sentence 301D is "Mr. Gupta gave good feedback." The tokens produced by the system are a "Gupta" token 302D, a "feedback" token 303D, and a "Mr." token 304D. Since this input sentence did not include the term "miss" the model correctly classified the sentence as positive, as opposed to the negative classification assigned to the example of FIG. 3B. As can be seen, in this example, the salutation designates a different gender as opposed to the salutation used in the example of FIG. 3B. However, using the causal explanation provided for FIG. 3B it is understood that the misclassification was not actually based upon a protected attribute (i.e., gender), but rather was caused by misinterpreting the term "miss" as a verb instead of a salutation. Thus, because of the causal explanation the user is not only notified that the model misinterpreted the term, but the user is also notified that the classification of the model was not biased based upon a protected attribute.

Figure 4:
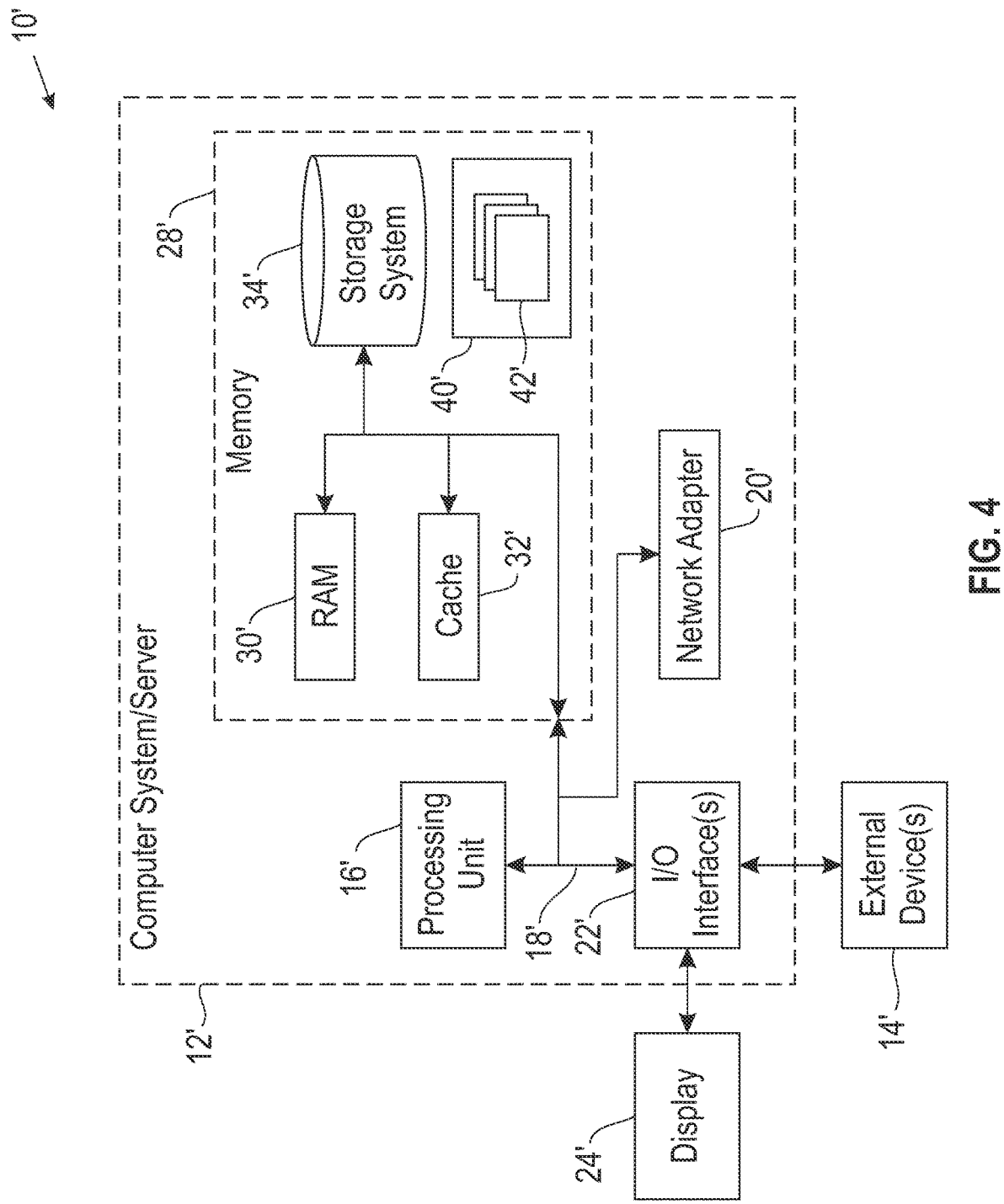
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving an input sentence for a classification by a machine-learning model, where the classification is based upon a sentiment of the input sentence;
    splitting the input sentence into a plurality of tokens, each of the plurality of tokens corresponding to a term within the input sentence;
    creating a causal subgraph from the plurality of tokens, wherein the creating is based upon a causal relationship identified between tokens of the plurality of tokens;
    identifying, using the causal subgraph, tokens of the plurality of tokens influencing the classification; and
    generating, based upon the tokens of the plurality of tokens, a causal explanation for the classification, wherein the causal explanation identifies at least one portion of the input sentence resulting in the classification.

2. The method of claim 1, wherein each of the plurality of tokens is identified utilizing a part-of-speech analysis.

3. The method of claim 1, comprising determining a causal attribute of the causal subgraph and wherein the identifying comprises identifying tokens corresponding to the causal attribute.

4. The method of claim 3, wherein the causal attribute comprises at least one of: a protected attribute and an aspect attribute.

5. The method of claim 1, wherein the generating the causal explanation comprises utilizing a natural language processing technique.

6. The method of claim 1, wherein the splitting comprises utilizing an information extraction technique.

7. The method of claim 1, wherein the identifying comprises identifying, utilizing a causal operator, a token of the plurality of tokens that changes the classification.

8. The method of claim 1, wherein creating the causal graph comprises creating a directed acyclic graph comprising nodes representing each of the plurality of tokens and edges representing relationships between connected tokens and being based upon a sentiment of the input sentence.

9. The method of claim 1, wherein the identifying comprises identifying alternative tokens influencing the classification from the plurality of tokens; and
    wherein the generating comprises identifying a prominent token from the plurality of tokens and generating the causal explanation based upon the prominent token.

10. The method of claim 1, wherein the identifying comprises identifying alternative tokens influencing the classification; and
    wherein the generating comprises utilizing a weighting technique to identify one of the alternative tokens and generating the causal explanation is based upon the alternative token.

11. An apparatus, comprising:
    at least one processor; and
    a computer readable storage medium having computer readable program code embodied therewith and executable by the at least one processor;
    wherein the computer readable program code is configured to receive an input sentence for a classification by a machine-learning model, wherein the classification is based upon a sentiment of the input sentence;
    wherein the computer readable program code is configured to split the input sentence into a plurality of tokens, each of the plurality of tokens corresponding to a term within the input sentence;

wherein the computer readable program code is configured to create a causal subgraph from the plurality of tokens, wherein the creating is based upon a causal relationship identified between tokens of the plurality of tokens;

wherein the computer readable program code is configured to identify, using the causal subgraph, tokens of the plurality of tokens influencing the classification; and wherein the computer readable program code is configured to generate, based upon the tokens of the plurality of tokens, a causal explanation for the classification, wherein the causal explanation identifies at least one portion of the input sentence resulting in the classification.

12. A computer program product, comprising:

a computer readable storage medium having computer readable program code embodied therewith, the computer readable program code executable by a processor;

wherein the computer readable program code is configured to receive an input sentence for a classification by a machine-learning model, wherein the classification is based upon a sentiment of the input sentence;

wherein the computer readable program code is configured to split the input sentence into a plurality of tokens, each of the plurality of tokens corresponding to a term within the input sentence;

wherein the computer readable program code is configured to create a causal subgraph from the plurality of tokens, wherein the creating is based upon a causal relationship identified between tokens of the plurality of tokens;

wherein the computer readable program code is configured to identify, using the causal subgraph, tokens of the plurality of tokens influencing the classification; and wherein the computer readable program code is configured to generate, based upon the tokens of the plurality of tokens, a causal explanation for the classification, wherein the causal explanation identifies at least one portion of the input sentence resulting in the classification.

13. The computer program product of claim 12, wherein each of the plurality of tokens is identified utilizing a part-of-speech analysis.

14. The computer program product of claim 12, wherein the computer readable program code is further configured to determine a causal attribute of the causal subgraph and wherein the identifying comprises identifying tokens corresponding to the causal attribute.

15. The computer program product of claim 14, wherein the causal attribute comprises at least one of: a protected attribute and an aspect attribute.

16. The computer program product of claim 12, wherein the generating the causal explanation comprises utilizing a natural language processing technique.

17. The computer program product of claim 16, wherein the splitting comprises utilizing an information extraction technique.

18. The computer program product of claim 12, wherein the identifying comprises identifying, utilizing a causal operator, a token of the plurality of tokens that changes the classification.

19. The computer program product of claim 12, wherein creating the causal graph comprises creating a directed acyclic graph comprising nodes representing each of the plurality of tokens and edges representing relationships between connected tokens and being based upon a sentiment of the input sentence.

20. The computer program product of claim 12, wherein the identifying comprises identifying alternative tokens influencing the classification from the plurality of tokens; and wherein the generating comprises identifying a prominent token from the plurality of tokens and generating the causal explanation based upon the prominent token.

* * * * *